(12) United States Patent
Hahlweg et al.

(10) Patent No.: US 7,815,248 B2
(45) Date of Patent: Oct. 19, 2010

(54) REARWARD-SIDE VEHICLE BODY STRUCTURE

(75) Inventors: Holger Hahlweg, Weil der Stadt (DE); Jan Christian Straeter, Gechingen (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 279 days.

(21) Appl. No.: 12/104,834

(22) Filed: Apr. 17, 2008

(65) Prior Publication Data
US 2008/0258501 A1 Oct. 23, 2008

(30) Foreign Application Priority Data
Apr. 18, 2007 (DE) .................. 10 2007 018 167

(51) Int. Cl.
*B60N 99/00* (2006.01)
(52) U.S. Cl. ................ 296/193.08; 296/203.04
(58) Field of Classification Search ........... 296/193.05, 296/193.08, 203.03, 203.04
See application file for complete search history.

(56) References Cited

U.S. PATENT DOCUMENTS

| | | | |
|---|---|---|---|
| 3,913,696 A | 10/1975 | Kennedy et al. | |
| 4,531,761 A | 7/1985 | Von Sivers | |
| 5,567,005 A | 10/1996 | Kosuge et al. | |
| 6,109,653 A | 8/2000 | Maruyama et al. | |
| 7,040,639 B2 | 5/2006 | Tamura | |
| 2002/0163173 A1 | 11/2002 | Ruehl et al. | |
| 2005/0046215 A1 | 3/2005 | Chung | |
| 2006/0061142 A1 | 3/2006 | Kobayashi et al. | |
| 2007/0278778 A1 | 12/2007 | Tanaka et al. | |

FOREIGN PATENT DOCUMENTS

| | | |
|---|---|---|
| DE | 32 17 959 A1 | 11/1983 |
| DE | 195 07 767 A1 | 9/1995 |
| DE | 199 47 759 C2 | 5/2001 |
| DE | 103 42 807 A1 | 4/2004 |
| DE | 10 2005 044 908 A1 | 4/2006 |
| DE | 11 2005 002 152 T5 | 7/2007 |
| EP | 0285131 A2 | 10/1988 |
| JP | 11334644 A | 12/1999 |

OTHER PUBLICATIONS

German Search Report dated Nov. 20, 2007 with English translation of relevant portion (Nine (9) Pages).
European Search Report dated Sep. 11, 2009.

*Primary Examiner*—Lori L Lyjak

(57) ABSTRACT

A rearward-side body structure of a vehicle, particularly a passenger car, has two side members mutually connected by a cross member. On each vehicle side, one console is provided, which in each case covers a junction node in a flat and form-integrated manner from below, in which junction node the cross member is to be fastened to the respective side member. The console has a bearing plate, on which a subframe of the vehicle can be supported. The bearing plate has at least one passage opening through which the subframe can be screwed to the vehicle body structure.

14 Claims, 2 Drawing Sheets

REARWARD-SIDE VEHICLE BODY STRUCTURE

CROSS-REFERENCE TO RELATED APPLICATION

This application claims the priority of German Application No. 10 2007 018 167.3, filed Apr. 18, 2007, the disclosure of which is expressly incorporated by reference herein.

BACKGROUND AND SUMMARY OF THE INVENTION

The present invention relates to a rearward-side body structure of a vehicle, particularly a passenger car, having two side members mutually connected by a cross member. On each vehicle side, one console is provided, which in each case covers a junction node in a flat and form-integrated manner from below, in which junction node the cross member is to be fastened to the respective side member.

From German patent document DE 10 2005 044 908 A1, a rearward-side body structure of a vehicle is known, which includes two side members as well as one cross member. The cross member mutually connects the two side members respectively in a junction node. On each vehicle side, a console is provided, which covers the respective junction node from below in a flat and form-integrated fashion. In the case of the known vehicle body structure, a seat surface for mounting a seat for a suspension spring is mounted on the respective console. In addition, the console is used for stiffening the junction node.

Other vehicle body structures are known, for example, from U.S. patent documents U.S. Pat. No. 6,109,653 and US 2002/0163173 A1 and German patent document DE 103 42 807 A1.

The present invention relates to the problem of indicating an improved embodiment for a vehicle body structure of the above-mentioned type, which is distinguished particularly by a greater functionality of the consoles.

According to the invention, this problem is solved by a rearward-side body structure of a vehicle, particularly a passenger car, having two side members mutually connected by a cross member. On each vehicle side, one console is provided, which in each case covers a junction node in a flat and form-integrated manner from below, and in which junction node the cross member is to be fastened to the respective side member. The respective console has a bearing plate on which a subframe of the vehicle can be supported. The respective bearing plate has at least one passage opening through which the subframe can be screwed to the vehicle body structure. Advantageous embodiments are also described and claimed herein.

The invention is based on the general idea of constructing a bearing plate at the respective console, which bearing plate is further developed such that a subframe of the vehicle can be supported thereon. Furthermore, it is suggested to equip the respective bearing plate with at least one passage opening, which makes it possible to screw the subframe virtually through the console to the vehicle body structure.

As a result of the novel construction, it is achieved, on the one hand, that the console has a greater functionality in that the rearward-side subframe of the vehicle can be supported on the latter. By integrating this subframe support in the console, a separate support of the subframe will not be necessary. The additional functionality of the console, therefore, leads to a reduction of the manufacturing costs for the vehicle body structure. On the other hand, fastening the respective subframe through the console on the junction node or on the vehicle body structure through the console permits a sufficiently firm linkage between the subframe and the vehicle body structure. It is only the fastening of the subframe on the vehicle body structure through the respective console that makes it possible to construct the bearing plate for supporting the subframe on the console. As a rule, the thickness of the material of the console, preferably designed as a preformed sheet metal part, is not sufficient for the fastening of the subframe on the console in order to be able to ensure the desired stability of a linkage directly at the console.

Corresponding to a preferred embodiment, in the respective junction node, a bush can be fastened to the respective side member and/or to the cross member and is aligned with respect to the respective passage opening of the bearing plate, has a thread, and is covered by the console. By use of such a bush, a sufficiently firm screw-on point can be created in a particularly simple and inexpensive manner for fastening the subframe to the vehicle body structure.

An additional embodiment is particularly advantageous, in which the respective bush is further developed as a vertical bush which is characterized by a vertical collar. The vertical collar is flatly supported on an interior side of the console facing the junction node on the bearing plate and thereby encloses the respective passage opening. As a result of this construction, the supporting forces, which are transmitted from the subframe to the bearing plate, are introduced by way of the vertical bush into the junction node. The console itself is thereby virtually uncoupled from the supporting forces. In particular, the console therefore is essentially exposed to no bending stress.

Additional important characteristics and advantages of the invention are contained in the claims, the drawings and the pertaining description of the figures by way of the drawings.

It is understood that the above-mentioned characteristics, which will be explained in the following, can be used not only in the respective indicated combination, but also in other combinations or alone without leaving the scope of the present invention.

Preferred embodiments of the invention are illustrated in the drawings and will be further explained in the following description, in which case the same reference numbers refer to the same or similar or functionally identically components.

DETAILED DESCRIPTION OF THE DRAWINGS

Figure 1:
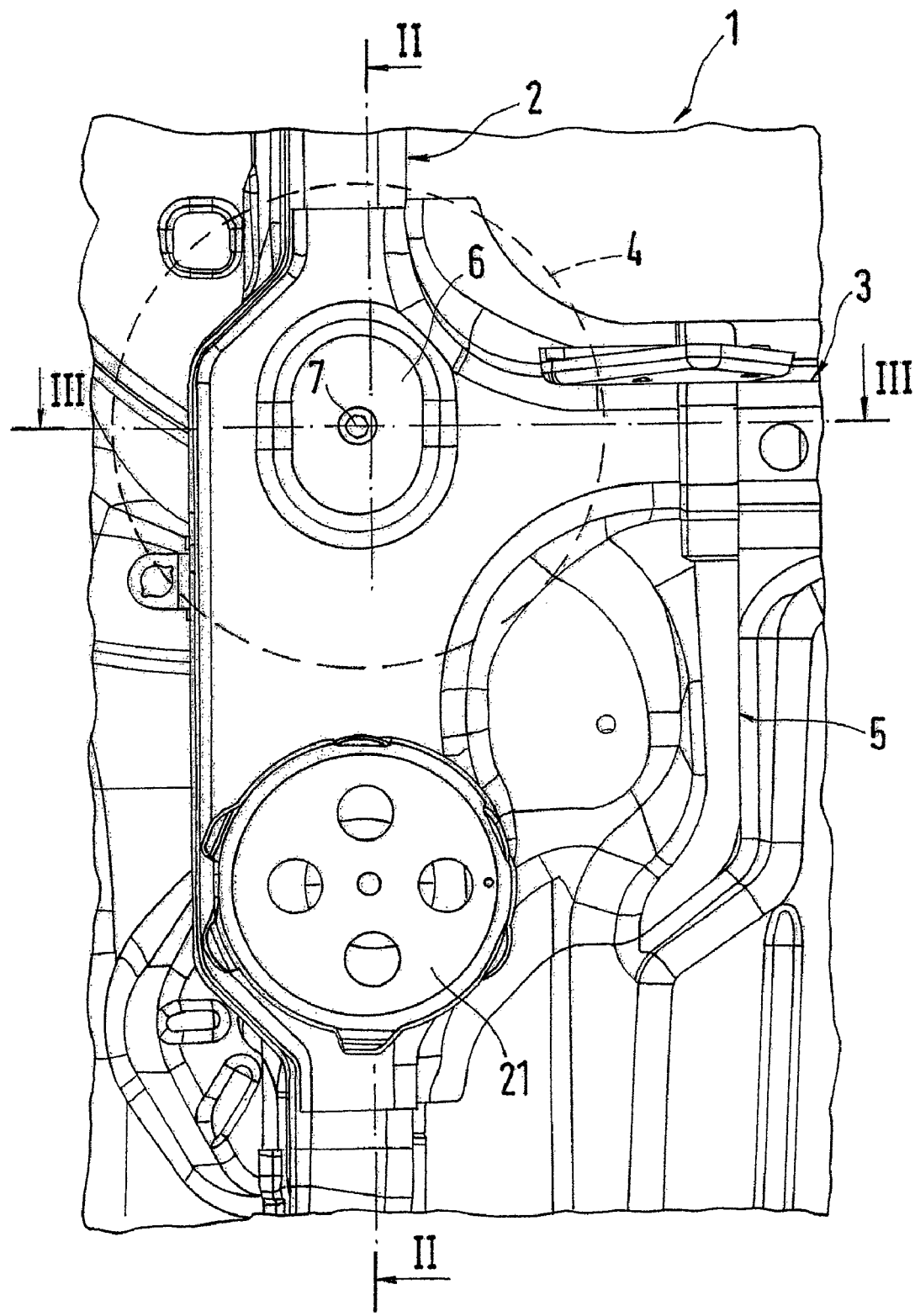
FIG. 1 is a schematic view from below of a rearward-side vehicle body structure in the area of a junction node between a side member and a cross member.

Corresponding to FIG. 1, a rearward-side body structure 1 (only partially shown here), of a vehicle, which is otherwise not shown and is preferably a passenger car, includes two side members 2, only one of which being visible in the cutout of the vehicle body structure 1 illustrated in FIG. 1. This side member 2 extends essentially parallel to the Intersection Line II and essentially parallel to the longitudinal direction of the vehicle. Furthermore, the vehicle body structure 1 includes a cross member 3 that mutually connects the two side members 2. The cross member 3 extends essentially parallel to the Intersection Line III and essentially transversely to the longitudinal direction of the vehicle. The connection point between the cross member 3 and the respective side member 2 forms a junction node 4, which is outlined here by a circle indicated by a broken line. This circle encloses essentially the area of the vehicle body structure 1 in which the actual junction node 4 is situated. An imagined intersecting point between the cross member 3 and the respective side member 2 is situated centrally in the junction node 4.

On each vehicle side, the vehicle body structure 1 has a console 5, which covers the respective junction node 4 from below; thus, on the side facing the viewer in FIG. 1. In this case, the console 5 is designed such that it virtually forms a negative impression of the 3D contour of the vehicle body structure 1 in the area of the junction node 4. In this manner, the console 5 can be added in a form-integrated manner to the vehicle body structure 1. For example, the console 5 reaches laterally over the cross member 3 as well as the respective side member 2. A doubling of the material is thereby achieved in the area of the junction node 4 or in the area of the vehicle body structure 1 covered by the console 5 in a flat and form-integrated manner. This doubling of material in connection with a corresponding fastening technique leads to a significant stiffening of the vehicle body structure 1 in the area of the junction node 4. A suitable joining technique is, for example, the placing of weld seams and/or weld spots. The console 5 is, preferably, further developed as a preformed sheet metal part.

The respective console 5 has a bearing plate 6 in which at least one passage opening 7 is formed, which extends through the console 5. The bearing plate 6 is further developed such that a subframe 8 of the vehicle outlined in FIGS. 2 and 3 can be supported thereon. The passage opening 7 makes it possible for the above-mentioned subframe 8, when it is supported on the bearing plate 6, to be screwed through the passage opening 7 and thus through the console 5 onto the vehicle body structure 1.

Figure 2:
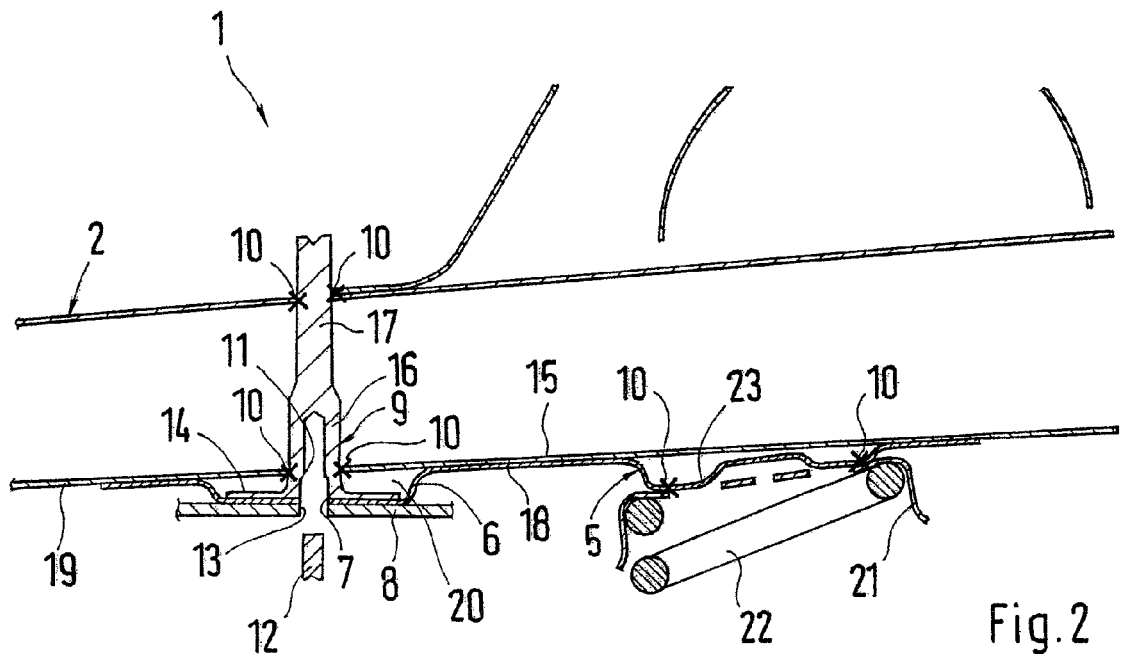
FIG. 2 is a simplified schematic sectional view corresponding to Intersection Line II-II in FIG. 1.
Figure 3:
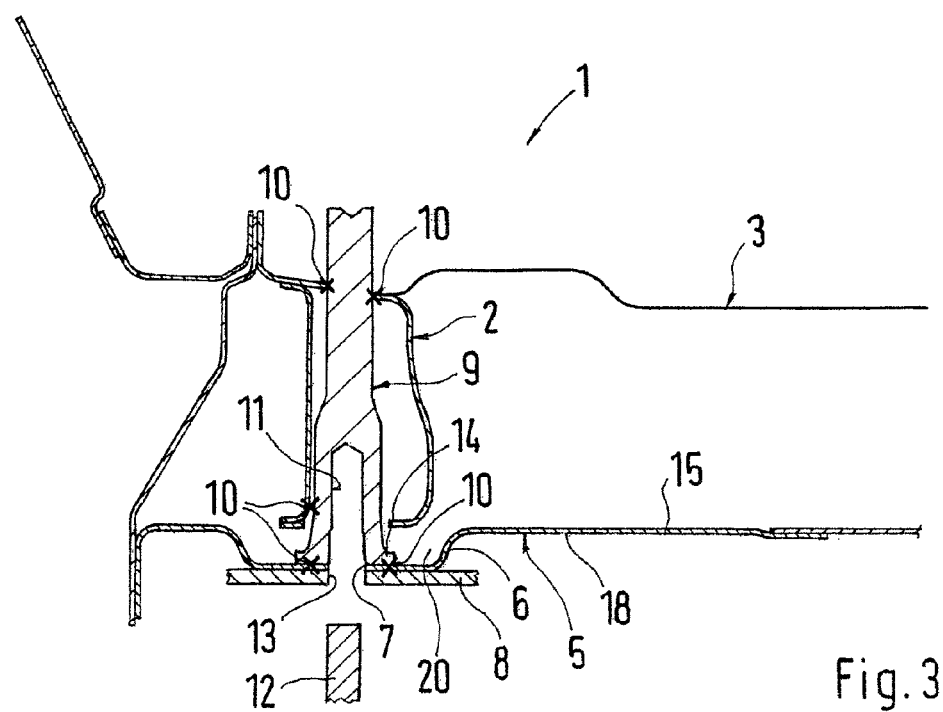
FIG. 3 is a simplified schematic sectional view corresponding to Intersection Line III-III in FIG. 1.

For this purpose, the vehicle body structure 1, corresponding to FIGS. 2 and 3, has a bush 9 in the respective junction node 4, which bush 9 is fastened to the vehicle body structure 1 in an appropriate manner. The bush 9 may, for example, be fastened to the side member 2. In addition or as an alternative, the bush 9 may be fastened to the cross member 3. In the embodiment illustrated in FIG. 3, the bush 9 is additionally fastened to the console 5. The fastening of the bush 9 to the vehicle body structure 1 takes place, for example, by means of weld seams or weld spots, which are marked by crosses and given the reference number 10 in FIGS. 2 and 3. The bush 9 has a thread 11 and is aligned with respect to the passage opening 7 of the bearing plate 6. Furthermore, the bush 9 is covered by the console 5. In this manner, the subframe 8 can be screwed to the vehicle body structure 1 by use of an only partially shown screw 12 (or threaded fastener), in that the screw 12 penetrates a fastening opening 13 formed in the subframe as well as the passage opening 7, and is screwed into the bush 9 or into its thread 11.

In the case of the preferred embodiments illustrated here, the bush 9 is further developed as a vertical bush, which in the following also has the reference number 9. The vertical bush 9 has a vertical collar 14 which projects radially at an end of the vertical bush 9 facing the console 5. This vertical collar 14 is flatly supported at the bearing plate 6 on an interior side 15 of the console 5 facing the junction node 4. In this case, the bush 9 is aligned such that the vertical collar 14 encloses the passage opening 7. It is achieved in this manner that, on the one hand, the bearing plate 6 is braced axially between the subframe 8 and the vertical bush 9 when the subframe 8 is fastened to the vehicle body structure 1. On the other hand, the bearing plate 6 is thereby more or less uncoupled—with the exception of axial clamping forces—from an axial transmission of force between the subframe 8 and the vertical bush 9, and therefore, from axial transmission forces between the subframe 8 and the vehicle body structure 1. The console 5 is supported in the area of the bearing plate 6 by way of the vertical bush 9 on the junction node 4 or on the vehicle body structure 1, whereby, by way of the bearing plate 6, a point suitable for the supporting of the subframe 8 can be created.

The bush 9 used here has a rod-shaped construction. In particular, it has a threaded section 16, which contains the thread 11, and a rod section 17, which is further developed, for example as a solid body. The bush 9, which is oblong to this extent, here penetrates the side member 2 as well as the cross member 3. Since here, at least the side member 2 is constructed as a hollow body, this creates the possibility of supporting or fixing the bush 9 in the area of an end facing the console 5 and in the area of an end away from the console 5 on the side member 2 or on the cross member 3. As a result, moments can also be absorbed by way of the bush 9.

On an exterior side 18 of the console 5 facing away from the respective junction node 4, the bearing plate 6 has a plane surface. As a result, a defined contact zone for contacting the subframe 8 is created which, in particular, permits a compensation of positional tolerances. Furthermore, in the illustrated example, the bearing plate 6 on the interior side 15 of the console 5 also has a plane surface. Thus, a contact surface can also be created on the interior side 15 of the bearing plate 6, which contact surface permits a compensation of positional tolerances and is advantageous particularly for the transmission of supporting forces.

FIG. 2 shows that a plane of the plate, which is not further described here, and in which the bearing plate 6 extends at least in the area of the passage opening 7, is inclined with respect to a member plane, which is also not described and in which, for example, an underside 19 of the side member 2, which faces the console 5, extends at least in the area of the bearing plate 6. As a result, an orientation of the bearing plate 6 can be achieved which is optimized for absorbing supporting forces.

Further, the bearing plate 6 projects with respect to a surrounding area of the console 5 enclosing the bearing plate 6 and thus with respect to the side member 2 or with respect to the cross member 3. In this manner, a cavity 20 is created in the area of the bearing plate 6 between the console and the side member 2 or the cross member 3, which cavity 20 in this case receives the vertical collar 14.

According to FIG. 1, the bearing plate 6 is positioned within the console 5 such that it is arranged essentially centrically with respect to the junction node 4. In particular, the imagined intersecting point of the side member 2 and of the cross member 3 is arranged within the bearing plate 6 and, particularly, within the passage opening 7. In the illustrated example, the passage opening 7 is situated centrically within the bearing plate 6 and thus essentially also centrically with respect to the imagined intersecting point between the side member 2 and cross member 3 and therefore, here also, essentially centrically within the junction node 4.

In the embodiment illustrated here, the console 5 according to FIGS. 1 and 2 additionally has a receiving cup 21 by way of which a spring device 22 can be supported on the console 5 and by way of the latter on the vehicle body structure 1 in the area of the junction node 4. The receiving cup 21 is, for example, welded to a suitable elevation, which is shaped out inside the console 5. Corresponding weld spots are also marked by crosses and given the reference number 10. As a result of a corresponding design of this elevation 23, the receiving cup 21 can be adapted particularly easily to a desired supporting direction. In the illustrated example, the receiving cup 21 is spaced away from the bearing plate 6 in the longitudinal direction of the side member 2.

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rearward-side body structure of a vehicle, comprising:
    two side members;
    a cross member mutually connecting the two side members;
    one console respectively provided on each side of the vehicle, said console covering a junction node in which the cross member is fastenable to a respective side member, the console covering the junction node in a flat and form-integrated manner from below;
    wherein each respective console has a bearing plate on which a subframe of the vehicle is supportable, the bearing plate having at least one passage opening through which the subframe is fastenable to the vehicle body structure; and
    wherein a plane of the bearing plate in an edge area of the bearing plate enclosing the passage opening is inclined relative to a member plane in which at least an area of the console surrounds the bearing plate.

2. The rearward-side body structure according to claim 1, further comprising:
    a bush having an internal thread, the bush being covered by the console and being aligned in a respective junction node with a respective passage opening; and
    wherein the bush is fastened to at least one of the cross member and a respective side member.

3. The rearward-side body structure according to claim 2, wherein the bush is a vertical bush having a vertical collar flatly supported on an interior side of the console on the bearing plate, the interior side facing the junction node.

4. The rearward-side body structure according to claim 2, wherein the bush penetrates at least one of the cross member and a respective side member.

5. The rearward-side body structure according to claim 3, wherein the bush penetrates at least one of the cross member and a respective side member.

6. The rearward-side body structure according to claim 2, wherein the bush is welded to at least one of the cross member and a respective side member.

7. The rearward-side body structure according to claim 3, wherein the bush is welded to at least one of the cross member and a respective side member.

8. The rearward-side body structure according to claim 4, wherein the bush is welded to at least one of the cross member and a respective side member.

9. The rearward-side body structure according to claim 1, wherein the bearing plate has a plane surface on an exterior side of the console facing away from the junction node.

10. The rearward-side body structure according to claim 1, wherein the bearing plate has a plane surface on an interior side of the console facing the junction node.

11. The rearward-side body structure according to claim 1, wherein the bearing plate projects from the junction node with respect to a surrounding area of the console that encloses the bearing plate.

12. The rearward-side body structure according to claim 1, wherein one of a respective side member and a respective passage opening is arranged in an area of an intersecting point between the respective side member and the cross member.

13. The rearward-side body structure according to claim 1, wherein the console has a receiving cup spaced apart from the bearing plate, the receiving cup being operatively configured for receiving a spring device.

14. The rearward-side body structure according to claim 1, wherein the vehicle is a passenger car vehicle.

* * * * *